W. N. BOOTH.
DETACHABLE MARGINAL FLANGE OR RING FOR PNEUMATIC TIRE RIMS.
APPLICATION FILED JAN. 30, 1911. RENEWED MAY 6, 1915.
1,162,216. Patented Nov. 30, 1915.
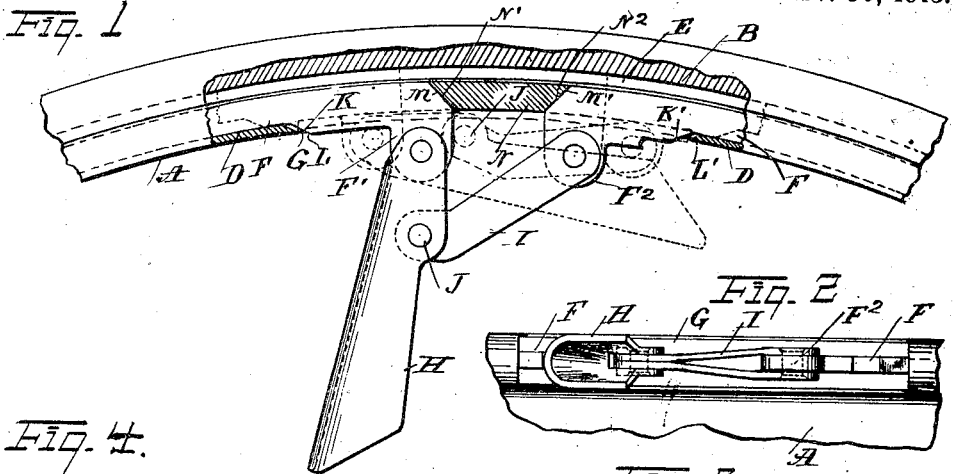
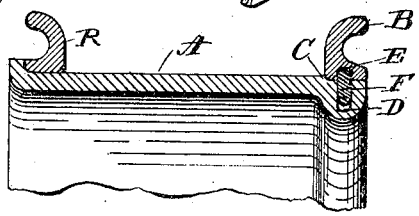
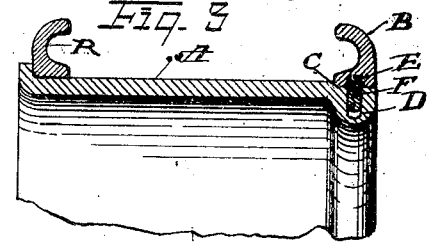
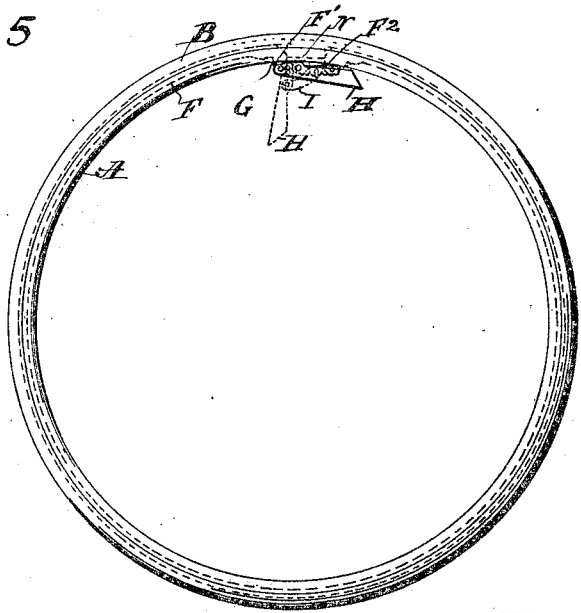

UNITED STATES PATENT OFFICE.

WILLIAM N. BOOTH, OF CLEVELAND, OHIO, ASSIGNOR TO THE BOOTH DEMOUNTABLE RIM COMPANY, OF CLEVELAND, OHIO, A CORPORATION OF OHIO.

DETACHABLE MARGINAL FLANGE OR RING FOR PNEUMATIC-TIRE RIMS.

1,162,216.   Specification of Letters Patent.   Patented Nov. 30, 1915.

Application filed January 30, 1911, Serial No. 605,528. Renewed May 6, 1915. Serial No. 26,444.

*To whom it may concern:*

Be it known that I, WILLIAM N. BOOTH, a citizen of the United States, and resident of Cleveland, in the county of Cuyahoga and State of Ohio, have invented certain new and useful Improvements in Detachable Marginal Flanges or Rings for Pneumatic-Tire Rims, of which I hereby declare the following to be a full, clear, and exact description, such as will enable others skilled in the art to which it appertains to make and use the same.

The objects of the invention are to provide a quickly detachable tire-retaining marginal ring or flange for the rim of a pneumatic tire. In this device the ring can be quickly and easily applied and removed and the securing means can be locked in the releasing position while the operator is working with the tire, and also can be securely locked when the tire is in position so as to prevent danger of displacement of the tire or of the securing means while on the road.

The invention has reference to a split locking ring adapted for insertion in an annular groove in the outer face of the rim, and is also adapted to be expanded to enter a corresponding annular groove in a removable clencher ring.

The tire retaining ring is also reversible in position and may be employed in connection with a second tire retaining ring on the opposite margin of the rim which may also be made removable and reversible if desired, to permit of the attachment of either a clencher or straight side tire thereto.

The invention comprises the specific construction of a lever operated expanding device for the locking ring, which by a reverse movement is adapted also to release the locking ring, and an important feature of the expanding device relates to its ability to lock itself in the open and closed positions.

The invention further includes positively acting means for forcing the extremities of the split ring gradually outward so that all portions of the expanded ring will enter the groove in the outer ring, and also includes positively acting means for forcing the extremities of the split ring inwardly when the ring is contracted.

The invention further comprises the combination and arrangement of parts and construction of details as hereinafter described, shown in the accompanying drawings and specifically pointed out in the claims.

In the accompanying drawings Figure 1 is a longitudinal section of the rim showing the operating lever and link for expanding and releasing the split ring. In this view the lever is shown in the open position in solid lines and in the closed position in the dotted lines; Fig. 2 is a view of the lever from the inside of the rim; Fig. 3 is a transverse section of tire and locking ring and marginal tire holding rings; Fig. 4 is a similar section of a rim showing the clencher rings in reversed position; Fig. 5 is a side elevation of the complete rim.

In these views A is the rim which may be a demountable or other rim of any type.

B is a tire retaining ring or flange and is slidingly movable or detachably secured upon the rim and preferably rests against a shoulder C in the rim and is thereby positioned so that it can be reversed in position as shown in Figs. 3 and 4. In the meeting faces of the tire and tire retaining ring are formed registering grooves D and E respectively. The groove E is preferably located exactly in the center of the inner face of the clencher ring, so that the ring can rest against the shoulder C and can be reversed in position as shown in Fig. 3 and one edge will always engage the shoulder C.

F is a split ring which is designed to be so constructed as to normally remain in the groove D in the rim, and to be expanded so as to partially enter the groove E in the ring, and thus retain the parts together, so that the tire holding ring cannot be removed until the split ring is again contracted. The outer corners of the extremities of the split ring may also be inclined at M, M' and a block N having two corresponding inclined faces N' and N² is inserted in the groove in the rim, against which the faces of the inclines M and M' will strike when the split ring contracts, thus forcing the extremities entirely out of the groove in the ring or flange. In Figs. 1 and 2 is shown mechanism for expanding this ring to enter the outer groove. Here F' and F² are radial extensions of the extremities of the split ring which project through the opening G in the rim. One end of the lever N is pivoted to the extremity F' and a link I is pivoted to the extremity F² and to the lever at a point J removed from the extremity F' a predetermined distance.

It will be seen that by pressing down the lever H the action of the lever and link will be to force apart the extremities of the split ring and the parts will assume the position shown in dotted lines with the pivot J beyond a line connecting the pivot points in the ring extremities F' and F², thus locking them in the expanded position.

The extremities of the split ring are also thickened or widened and provided with reversely inclined surfaces K and K' which engage the end walls of the opening at L, L' and as the split ring is expanded serve to force the extremities radially outward, so that a positive action upon the extremities is effected, forcing them into the outer groove. Also the thickened portions fill the groove at the edges of the opening G and keep out the dust when the ring is expanded.

When released the split ring being formed of spring material such as steel, the lever will be returned to its original position with the pivot points in the extremity F' and in the lever at J in a radial line and the shoulders K and K' engage the shoulders L, L' thus locking the ring in the inner groove while the tire is being removed or put in place and permitting the clencher ring B to be freely handled. These locking shoulders are augmented by the automatic contraction of the ring. The other flange or ring R may be removable and reversible if so desired.

The lever N is formed preferably of sheet metal and channeled or channel shaped so that when closed down upon the link I the sides of the channel will inclose the link and the lever will cover the opening in the rim to prevent dust from entering.

Having described the invention what I claim as new and desire to secure by Letters Patent is:

1. The combination with a wheel rim having a shoulder near one edge and an annular groove centrally located between said shoulder and said edge, of a laterally removable, reversible, tire retaining ring thereon adapted to engage said shoulder at its inner edge, said ring provided with a central annular groove in its inner face registering with the groove in said rim, a spring split ring adapted to normally remain in the groove in the rim, said tire retaining ring shaped to be interchangeably used to retain a clencher or straight side tire, and means for expanding the said ring.

2. The combination with a rim provided with a shoulder near one edge and with an annular groove in its outer face centrally located between said shoulder and edge and also provided with a radial opening communicating with said groove, of a reversible tire retaining ring provided with a registering groove centrally located in its inner face, a spring split ring adapted to normally remain in the groove in the rim, the extremities of said ring being turned radially inward through said opening in said rim, a lever pivotally connected with one extremity of the split ring, a link pivotally connected to the other end of the split ring at one end and at the other end to said lever at a point removed from the pivot point of the lever, and means located in the groove in said ring for forcing the extremities of said split ring inwardly when the split ring is contracted.

3. The combination with a metal rim, of a tire holding ring laterally movable thereon, said rim and ring provided with registering grooves, inwardly extended extremities for said ring, a split ring in said groove in said rim, a channeled lever pivoted to one extremity of said split ring, a link pivoted at one end to the other extremity of said ring, and to said lever at a point removed from the pivotal point of said lever, said channeled lever adapted to inclose said parts when the ring is expanded, to exclude dust therefrom.

4. The combination with a metal rim having a shoulder near one edge and provided with an annular groove centrally located between said shoulder and edge, of a reversible tire holding ring adapted to engage said shoulder, and provided with an annular groove centrally located between its inner and outer edges, a split spring ring adapted to normally lie in said groove in said rim, said split ring having projecting extremities and said rim having an opening through which said extremities project, an inclined face in each extremity engaging the end walls of said opening, outwardly beveled ends for said split ring, a block in the groove of the rim placed intermediate of the ends of the split ring, said block having outwardly beveled edges, a lever pivoted to one of said extremities, a link pivoted to the other of said extremities and to said lever, the pivots in said lever adapted to assume a radial position to lock the lever rigidly when in the expanded position.

5. The combination with a metal rim, having an opening, of a laterally movable tire retaining ring thereon, said rim and tire retaining ring provided with annular registering grooves, a spring split ring adapted to normally remain in the groove in said rim and having its extremities projecting through said opening, a pivotally connected lever and link connecting the projecting ends of said split ring, said lever being channeled and adapted to fold over said opening, to cover the same and to inclose said link, and a block having oppositely inclined faces and secured in the said groove in the ring intermediate of the extremities of the split ring, said inclined faces adapted to engage said extremities while said split ring is being contracted to force said extremities inward, out of engagement with the groove in the said tire retaining ring.

In testimony whereof, I hereunto set my hand this 25" day of January, 1911.

WILLIAM N. BOOTH.

In presence of—
  W<small>M</small>. M. M<small>ONROE</small>,
  G. A. H<small>OWELLS</small>.